United States Patent [19]

Layre et al.

[11] Patent Number: 5,340,463
[45] Date of Patent: Aug. 23, 1994

[54] PROCESS FOR OBTAINING MULTILAYER MATERIALS SUITABLE FOR TRANSFORMATION INTO HOLLOW BODIES BY DRAWING OR DRAWING AND IRONING

[75] Inventors: René Layre, Brignoud; Richard Bosc, Voreppe, both of

[73] Assignee: Cegedur Pechiney Rhenalu, Paris, France

[21] Appl. No.: 985,505

[22] Filed: Dec. 1, 1992

Related U.S. Application Data

[63] Continuation of Ser. No. 541,513, Jun. 21, 1990, abandoned.

[30] Foreign Application Priority Data

Jul. 6, 1989 [FR] France .................. 89 09452

[51] Int. Cl.⁵ .................. B21D 22/28; B21D 51/26
[52] U.S. Cl. .................. 205/201; 72/42; 72/46; 148/258; 205/109; 205/139; 205/222; 427/261; 427/409
[58] Field of Search ........... 205/196, 199, 201, 222, 205/139, 153; 72/41, 42, 46; 148/258; 427/258, 261, 409

[56] References Cited

U.S. PATENT DOCUMENTS

| | | | |
|---|---|---|---|
| 2,530,838 | 11/1950 | Orozco et al. | 252/25 |
| 3,287,264 | 11/1966 | Topper | 252/28 |
| 3,787,338 | 1/1974 | Skelly et al. | 204/181.6 X |
| 3,832,962 | 9/1974 | Rolles | 113/120 A |
| 3,899,625 | 8/1975 | Izumi et al. | 428/457 |
| 4,250,727 | 2/1981 | Baril et al. | 72/46 |
| 4,411,145 | 10/1983 | Lewis et al. | 72/42 |
| 4,506,533 | 3/1985 | Hessel et al. | 72/42 |
| 4,687,587 | 8/1987 | Daglish et al. | 252/11 |

FOREIGN PATENT DOCUMENTS 1533057 11/1978 United Kingdom .
2003415 3/1979 United Kingdom .
2019884 7/1979 United Kingdom .

OTHER PUBLICATIONS

F. A. Lowenheim, Electroplating, McGraw-Hill Book Co., New York, 1978, pp. 452–471.
Metal Finishing Guidebook & Directory for 1975, Metals and Plastics Publications, Inc., Hackensack, N.J., pp. 531–539.
Mahlon E. Campbell, "Solid Lubricants–Where They Stand Today", *Chemical Engineering*, Oct. 1, 1993, pp. 56–66.
Japanese Patents Report, vol. 77, No. 26, Jul. 1977, Sect. J7-H Derwent Publications Ltd.

*Primary Examiner*—John Niebling
*Assistant Examiner*—William T. Leader
*Attorney, Agent, or Firm*—Dennison, Meserole, Pollack & Scheiner

[57] ABSTRACT

A process for obtaining a multilayer material suitable for transformation by drawing or drawing and ironing into a hollow body having a height to diameter ratio greater than 2.5. The process comprises subjecting an aluminum alloy substrate to an anodizing or chemical conversion surface treatment for improving adherence thereto, covering one of the surfaces of the substrate by adhering a plastic material film thereto, and covering the other of the surfaces with a coating of varnish including a solid lubricant in the form of particles which are harder than the varnish. The coated substrate is subsequently drawn or drawn and ironed into a hollow body utilizing tools having a hardness which is greater than the particles.

22 Claims, 4 Drawing Sheets

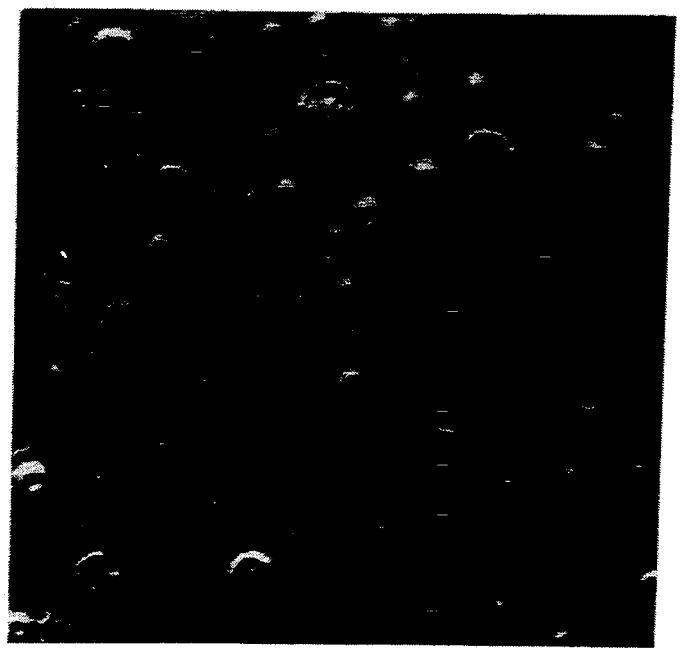
FIG. IA
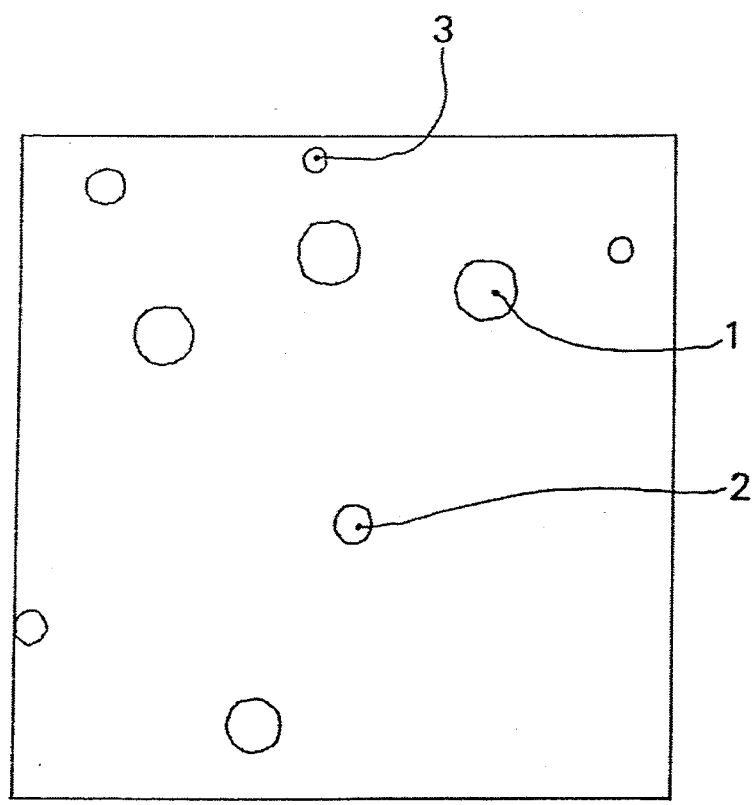
FIG. IB

PROCESS FOR OBTAINING MULTILAYER MATERIALS SUITABLE FOR TRANSFORMATION INTO HOLLOW BODIES BY DRAWING OR DRAWING AND IRONING

This is a continuation of copending application Ser. No. 07/541,513 filed on Jun. 21, 1990, now abandoned.

The invention relates to a process for obtaining multilayer materials suitable to be transformed into hollow bodies by drawing or drawing and ironing and having a height to diameter ratio exceeding 2.5.

British Patent 2003415 discloses a process for obtaining cylindrical objects from flat multilayer materials in which shaping is brought about by drawing and ironing. The process comprises the following stages:

"producing a multilayer material having a plastic film and an adhesive resin coating on at least one of the faces of a metal sheet;

preparing a blank from said material;

applying a punch to said blank through several drawing and ironing blanking dies in order to form an elongated cylindrical object, whose walls have a reduced thickness compared with the initial thickness of the blank;

separating the object from the punch;

said multilayer material being able to withstand drawing and ironing without decomposition or decohesion."

With regards to the last stage, it is obvious that the capacity of the material to resist deformation imposed by the drawing and ironing operation and of not suffering from either decohesion or decomposition is not unlimited and will be dependent on the deformation rate, which is generally expressed by the height to diameter ratio (H/D ratio).

If reference is made to the British Patent and more particularly to the example contained therein, it can be gathered that cans are obtained with a height of 127 mm and a diameter of 66.3 mm, i.e. a H/D ratio close to 1.9, but no reference is made to the application of higher ratios.

SUMMARY OF THE INVENTION

Thus, the Applicant being interested in the production of in particular aerosol cans by drawing and ironing and for which the H/D ratio is between 3 and 4 found that decohesion and deformations occurred on the outer face of the blank on using the prior art multilayer materials and that consequently the metal substrate was exposed at certain points with all the prejudicial consequences which result from this, namely the corrosive action of the atmosphere on the substrate and a deterioration in the aesthetic appearance of the can.

Research carried out with a view to obviating this problem has led to the present invention, which consists of a process for obtaining multilayer materials transformable into hollow bodies by means of drawing or drawing and ironing tools and which can have a height to diameter ratio exceeding 2.5, said materials having an aluminium alloy substrate, which has undergone a surface treatment and which is covered on one of its faces by a plastics material film and on the other face by a varnish coating, characterized in that the varnish coating contains a solid lubricant in the form of particles which are harder than the varnish and less hard than the tools.

Thus, in connection with a multilayer material having a metal substrate and coated on its two faces with organic products, the invention has the special feature of using a varnish or lacquer with which has been mixed solid lubricant particles. Thus, this varnish or lacquer which is to form the outer surface of the drawn product has a surprising property, due to the fact that certain of its particles are flush with one another of acting as a self-lubricant, so that there is no need to use any conventional viscose, fatty lubricant during the drawing and ironing and it can be replaced by water. This water at the same time serves to cool the tools and to remove the solid particles which might become detached during the operation. The presence of a surfactant in said water can in certain cases assist the transformation operations. These agents can be anionic, cationic or neutral based on ethylene oxide and are used in quantities between 0.01 and 3% by weight based on the water and preferably between 0.05 and 0.5% by weight, so as to lower the surface tension of the water below $30 \times 10^{-3}$N. $m^{-1}$. Surfactants having fluorinated groups or chains, such as those sold by ATOCHEM under the registered trade mark FORAFAC are particularly suitable.

The elimination of the conventional lubricant has important consequences for the economic aspects of manufacturing the hollow bodies, because on the one hand water is less expensive and on the other the objects no longer have to be degreased prior to use. In addition, it is possible to obviate operations for the recovery of said lubricants and the pollution problems which can result therefrom.

The means according to the invention are particularly suitable in the case where the H/D ratio exceeds 2.5 and also considerably improve the drawing conditions of hollow bodies having a lower H/D ratio.

The particles used in the process are constituted by a micronized, solid lubricant, which is insoluble or only slightly soluble in the varnish, which has a softening point above 60° C. and which is harder than the varnish, but less hard than the tools. This lubricant is preferably chosen from the group formed by plastic materials such as polyethylene, polypropylene, polytetrafluoroethylene or non-poymerized organic materials, such as fatty acid amides. Said lubricant can be a mixture of particles differing as a result of their size and/or chemical composition.

Preferably, the solid particles are chosen in the mean diameter range between 1 and 30 $\mu$m, but the best results are obtained in the range 10 to 20 $\mu$m. The term mean diameter is here understood to mean the mean value of the largest dimensions of the particles, which are not necessarily spherical. However, it is preferable for the ratio of the mean diameter to the thickness of the varnish to be in excess of 1, in order that the said particles can be flush and come into contact with the tools in order to exercise their lubricating function in an optimum manner. Preferably, the ratio is between 1 and 10 and the optimum is between 4 and 10.

Once again in a preferred manner, the content of varnish particles is between 0.1 and 10% by weight, based on the dry varnish, but the optimum lubricating conditions correspond to the range 0.5 to 5%.

With regards to the actual varnish, the applicant has found that it was possible to use the varnishes conventionally used in the production of hollow bodies for packing purposes, such as epoxy-urea, epoxy-phenolic, vinyl organosol and polyester varnishes, preferably having a dry varnish thickness on the Al substrate between 1 and 8 μm and preferably between 2 and 5 μm.

Apart from the solid lubricant, the varnish can contain other charges such as dying agents, e.g. 1 to 5% of titanium dioxide-based white pigment, said limitation to less than 5% being made so as not compromise the ductility of the varnish to which the pigment is added.

The solid lubricant-charged varnish coating is baked under the conventional temperature and time conditions, generally between 120° and 250 °C. for between 15 seconds and 15 minutes, so as to permit a total baking and the development of the maximum adhesion.

The aluminium alloy substrate is constituted by any alloy conventionally used in the field of hollow bodies for packing purposes, such as aerosol cans, cans for the agroalimentary industry and sealing caps.

Alloys in the 3000 series e.g. 3004 and those in the 5000 series e.g. 5052 are very suitable (these designations corresponding to the aluminium association standards). However, it is obvious that as a result of the special properties of the varnish used, the surface pick-off phenomena, called galling, which occur during drawing and ironing become much less frequent and it is possible to use alloys other than those described hereinbefore.

However, in order to best meet the difficult shaping conditions to which the multilayer material is exposed, the metal constituting the substrate generally undergoes a surface treatment prior to coating. These treatments include anodization and preferably this is carried out under conditions where oxide thicknesses between 30 and 80 nm are produced, the optimum being between 30 and 50 nm in order to best satisfy the attachment functions with the coatings and in particular the lubricant-containing varnish. Anodization in a phosphoric medium is particularly suitable in the scope of the invention.

In the same way, the chemical conversion like that preferably developing coating thicknesses between 20 and 60 nm and in particular using a phosphochromic medium has proved particularly appropriate for giving the substrate the desired adhesion properties relative to different coatings and in particular the lubricant-containing varnish.

With regards to the plastics material film covering the substrate on the side opposite to the varnish coating which will form the outer surface of the drawn product, it has perfect adhesive characteristics in the same way as the varnish to the Al alloy substrate, as a result of the presence of chemical conversion or anodic oxide coatings. Said film remains tight during deformation and serves as a barrier against any material, which may be corrosive to aluminium and which is placed in contact therewith, so that there is no need for a varnishing or glazing said film. The plastics material film prevents any seizing of the drawing tools and in combination with the properties of the external varnish makes it possible to achieve particularly high deformation ratios. The film has a thickness between 15 and 100 μm and preferably between 30 and 60 μm and an elongation level exceeding 200% in all directions (longitudinal and transverse directions).

Several different film types can be used. In a first type, use is made of a polyolefin such as polyethylene (PE) and in particular HDPE, or polypropylene (PP), or a copolymer of PE or PP either alone, or with another olefin. In this case an adhesive is used for adhering the film to the substrate. This polyolefin can contain additives or charges conventionally used to give a particular appearance to the drawn product, such as dyes or pigments, or in order to give tribological properties, such as e.g. 0.1 to 0.5% by weight of bistearamide ethylene.

According to a second type, the film is a mixture of at least 50% by weight polyolefin and at the most 50% by weight acid copolymer and the adhesive is a generally extrudable mixture of at least 50% by weight of an acid copolymer and at the most 50% by weight of polyolefin. The film and the adhesive are preferably applied to the substrate by a coextrusion process, rather than layer-by-layer extrusion. This coextrusion also makes it possible to incorporate additives or charges.

According to a third type, a polyethylene film and preferably a low density linear polyethylene film is applied. The ambient product can then be decorated by printing or any other finishing stage.

BRIEF DESCRIPTION OF THE DRAWINGS

The invention is described in greater detail hereinafter relative to the attached drawings, wherein:

FIG. 1A is a photograph with a 500× magnification of the varnish coating prior to drawing;

FIG. 1B is a diagram relative to FIG. 1;

DESCRIPTION OF THE PREFERRED EMBODIMENTS

FIGS. 1A and 1B show a large number of generally circular protuberances or bosses, e.g. the protuberances 1,2 and 3 of respective diameters 16,10 and 6 μm, which form reliefs on the surface of the varnish and which correspond to the solid lubricant particles.

Figure 2:
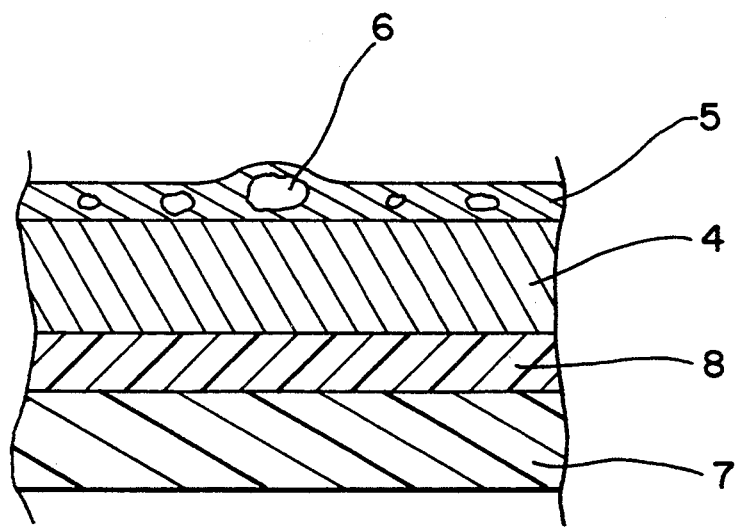
FIG. 2 shows a section through a multilayer material.

FIG. 2 shows an aluminium alloy substrate 4 anodized on its two faces, a varnish coating 5 containing solid lubricant particles 6, a plastics material film 7 constituted by an 85% by weight mixture of acid copolymer based on acrylic ethylene and 15% by weight of high density polyethylene linked with the substrate by adhesive 8.

Figure 3A:
FIG. 3A is a photograph identical to that of FIG. 1, but in which the varnish coating has undergone drawing.
Figure 3B:
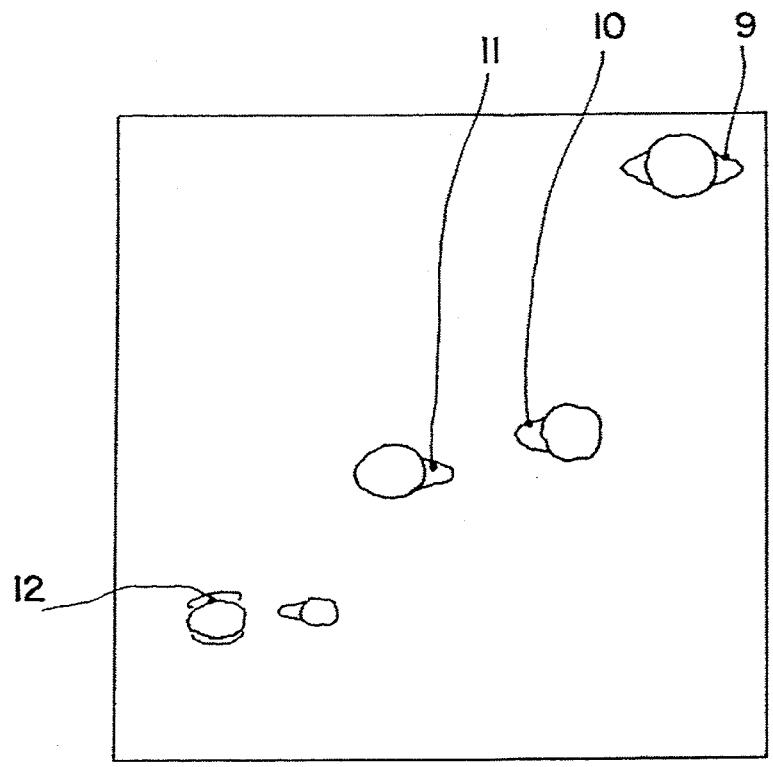
FIG. 3B is a diagram for FIG. 3.

FIGS. 3A and 3B show the solid lubricant particles still present in the form of protruberances 9,10,11 and 12 and that they have not or only slightly been deformed by drawing. However, it is possible to see a decohesion between the varnish and the particles to the front and-/or rear of certain larger particles. This decohesion leaves traces oriented in accordance with the drawing direction.

Figure 4A:
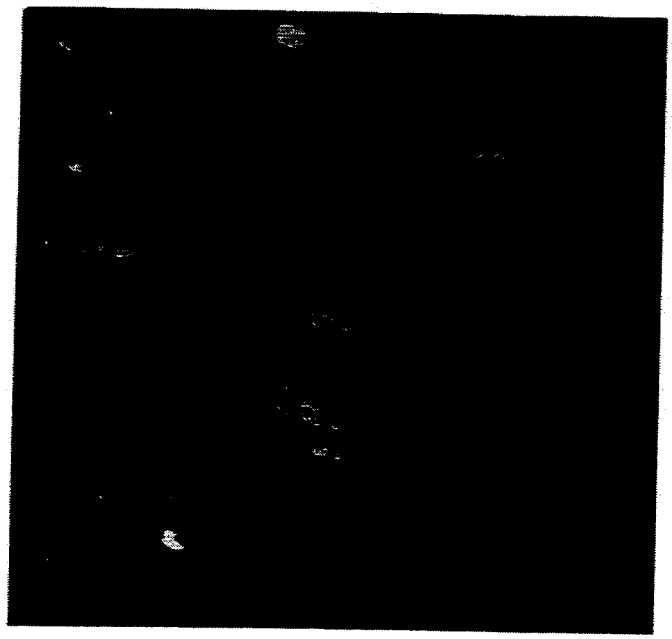
FIG. 4A is a photograph identical to that of FIG. 1 of the varnish coating after drawing and ironing.
Figure 4B:
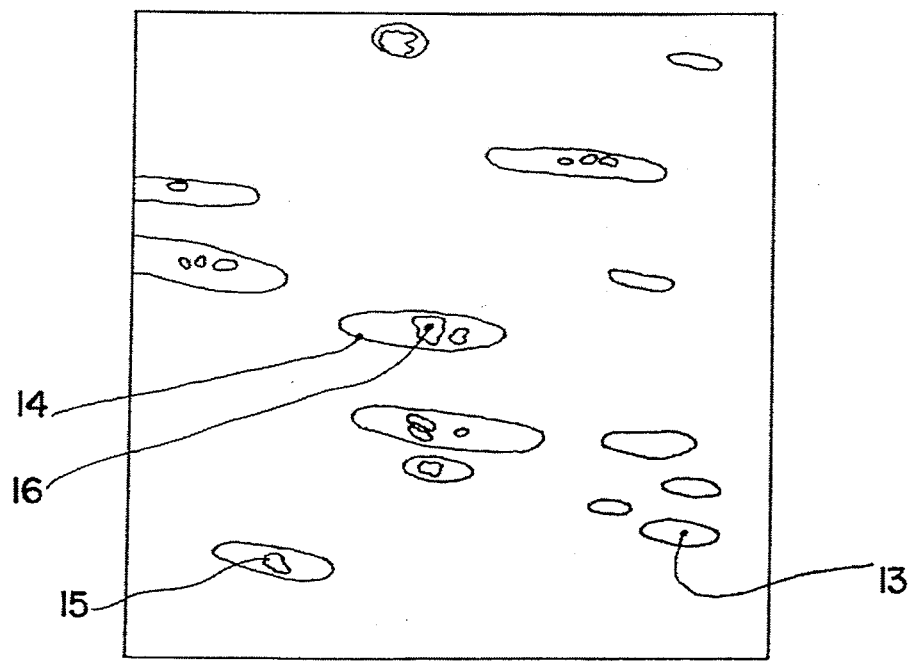
FIG. 4B is a diagram for FIG. 4.

FIG. 4A shows that following ironing all the solid lubricant particles have disappeared and that they have left behind lines 13,14,15 in hollows in the form of very elongated ellipses having various dimensions. However, despite the fact that the varnish only has a very small final thickness it continues to adhere to the substrate. However, in the centre of certain traces or lines there are small zones 16 representing less than 1% of the total surface where the metal is exposed. These zones would appear to correspond to the contact zones between the largest particles and the metal and which are uncovered by a tear-off effect.

Thus, the solid lubricant particles behave in the same way as "sacrificial" lubricant particles, which are progressively eliminated during ironing, this taking place at the start for the largest particles and at the end for the smallest particles.

The invention can be illustrated by the following example with reference to the preceding drawings.

Preparation of the Aluminium Alloy Substrate

A strip of aluminium alloy 3004 in state H19 and with a thickness of 500 μm underwent degreasing on its two faces in the presence of phosphoric acid, followed by phosphoric anodic oxidation leading to a 60 nm thick oxide coating.

Preparation of the Multilayer Material

1. Firstly, the face of the Al strip 4 which is to become the outer face of the drawn product is varnished, by coating one of the faces of the Al strip with an acrylic-type varnish mixture (HOLDEN varnish 326412) and 1.5% by weight of solid lubricant consisting of a mixture of PE/PTFE particles (6) of mean diameter 2.5 μm with a maximum of 9 μm (LANGER & C0 reference TF/1778), so as to form, following the complete baking of the varnish for 12 minutes at 180° C., a 2 μm thick dry varnish coating (5).

Typically, baking is carried out at between 160° and 260° C. with times ranging between 15 sec and 15 min, the high temperature baking associated with a short period of time requiring a continuous treatment of the Al strip in a belt oven, whereas the lower temperature baking associated with the longer period of time generally presupposes the prior cutting of the strip in to portions called formats.

The scanning electron microscopy (SEM) of the varnish surface obtained corresponds to FIGS. 1A and 1B.

2. The other face of the Al strip (4) already coated with the varnish (5) is then coated with a polypropylene (PP) film (7), which thus gives a multilayer strip according to the invention (FIG. 2). For this purpose an adhesive 3 μm polyurethane coating (8), designated 3640 from HENKEL, is coated on to the other face of the Al strip preheated to 60° C. After evaporating the solvents, the "cast" quality PP film (7) with a thickness of 50 μm and an elongation of 400 to 600% in all directions is applied by calendering and the thus coated Al strip and the PP film are made to travel between two rollers, so that the PP film adheres by pressure to the adhesive coating. One of the two rollers is heated, whilst the other, which is in contact with the PP film is coated with PTFE and does not adhere to the PP or to the PE, even in the melted state.

This leads to a strip-like multilayer material, which has been shaded like a hollow body with a diameter (D) of 47 mm and a height (H) of 160 mm, i.e. H/D ratio of 3.4.

The shaping of the multilayer strip has involved a first drawing stage followed by a second ironing stage in accordance with the following range:

| OPERATION | D (diameter) | H (height) | SKIRT THICKNESS | H/D |
|---|---|---|---|---|
| DRAWING | | | | |
| cutting a circular blank | 127 mm | — | — | — |
| first pass | 65 mm | 45 mm | 0.55 mm | 0.7 |
| second pass | 47.6 mm | 77 mm | 0.55 mm | 1.6 |
| IRONING | | | | |
| first ring | 47.4 mm | 100 mm | 0.40 mm | 2.1 |
| second ring | 47.3 mm | 115 mm | 0.35 mm | 2.4 |
| third ring giving uniform length | 47.0 mm | 160 mm | 0.25 mm | 3.4 |

This shaping could be carried out continuously on the basis of the multilayer strip, or following the cutting thereof into portions or formats.

Ironing is carried out accompanied by the suction of water to which has been added 0.1% by weight of the surfactant FORAFAC (registered trademark), in such a way that the water more particularly wets the outer surface of the cup obtained after drawing, with a view to cooling the ironing rings, reducing the risks of damage to the inner and outer surfaces of the hollow body and for eliminating any contamination or residues, such as solid lubricant particles which have torn away during ironing.

The inner surface has a uniform appearance when examined visually. Electrical conductivity tests or so-called WACO tests making it possible to measure the degree of damage of an internal coating by measuring at constant voltage the intensity of the current passing between a metal hollow body and its content based on a saline solution, were carried out on samples at the end of drawing and after each ironing path (Table I):

| Hollow body D × H | Filling height (20% NaCl solution) | Intensity (under 6.3 V) |
|---|---|---|
| 47.6 × 77 | 50 mm | 0 mA |
| 47.4 × 100 | 80 mm | 0 mA |
| 47.3 × 100 | 80 mm | 0.5 mA |
| 47 × 160 | 120 mm | 1 mA |

With respect to the tested surfaces, intensity values below 5 mA are considered acceptable.

The intensity values obtained illustrate the low porosity obtained after the shaping, so that, as it is, said inner surface is suitable for the conditioning even of corrosive products, without requiring any complimentary treatment.

The process can be used in the production of materials to be used in the manufacture of hollow bodies or containers, whose height to diameter ratio exceeds 2.5.

We claim:

1. In a process for obtaining a multilayer material suitable for transformation by drawing or drawing and ironing into a hollow body having a height to diameter ratio greater than 2.5, and comprising subjecting an aluminum alloy substrate having first and second surfaces to an anodizing or chemical conversion surface treatment for improving adherence thereto, covering one of the surfaces by adhering a plastic material film thereto, and covering the other of said surfaces with a coating of varnish of known thickness, the improvement comprising incorporating into said varnish a solid lubricant in the form of particles of known mean diameter which are harder than said varnish, the ratio of said mean diameter to said thickness being at least about 4, with said particles thereby forming protuberances in said coating of varnish.

2. Process according to claim 1, wherein the solid lubricant comprises particles selected from the group consisting of polyethylene, polypropylene, polytetrafluorethylene, amides and mixtures thereof.

3. Process according to claim 1, wherein the particles have a mean diameter between 1 and 30 $\mu$m.

4. Process according to claim 1, wherein the surface treatment of the substrate is an anodization.

5. Process according to claim 4, wherein the anodization develops an oxide thickness on said surfaces between 30 and 80 nm.

6. Process according to claim 4, wherein said anodization is carried out in a phosphoric medium.

7. Process according to claim 1, wherein the substrate surface treatment is a chemical conversion.

8. Process according to claim 7, wherein the chemical conversion develops a coating thickness on said surfaces between 20 and 60 nm.

9. Process according to claim 7, wherein the conversion is carried out in a phosphochromic medium.

10. Process according to claim 9, wherein the composition of the varnish is selected from the group consisting of acrylic, epoxy-urea, vinyl organosol, epoxyphenolic and polyester varnishes.

11. Process according to claim 1, wherein the varnish coating has a thickness between 1 and 8 $\mu$m.

12. Process according to claim 11, wherein the thickness of the varnish coating is between 2 and 5 $\mu$m.

13. Process according to claim 1, wherein the film is of a plastic material having a thickness between 15 and 100 $\mu$m and an elongation level greater than 200% in all directions.

14. Process according to claim 13, wherein the film thickness is between 30 and 60 $\mu$m.

15. Process according to claim 1, wherein the plastic material film is a polyolefin.

16. Process according to claim 1, additionally comprising baking said substrate having a coating of varnish incorporation lubricant particles to form a coating of dry varnish.

17. Process according to claim 16, wherein the solid lubricant has a content in the dry varnish of between 0.1 and 10% by weight.

18. Process according to claim 17, wherein the content is between 0.5 and 5%.

19. Process according to claim 1, additionally comprising transforming said substrate covered with said coating of varnish and said plastic material to a hollow body having a height to diameter ratio greater than 2.5, utilizing tools having a hardness greater than said particles.

20. Process according to claim 19, wherein during the transformation, the varnish coating occupies the outer face of the hollow body obtained.

21. Process according to claim 1, wherein said particles have a softening point about 60° C. and are insoluble or slightly soluble in the varnish.

22. Process according to claim 1, wherein the ratio of said mean diameter to said thickness is between 4 and 10.

* * * * *